April 6, 1937.  D. J. O'CONNELL  2,076,479
AUTOMATIC TOASTER
Filed Jan. 12, 1935   2 Sheets-Sheet 1

Inventor
Daniel O'Connell

April 6, 1937. D. J. O'CONNELL 2,076,479
AUTOMATIC TOASTER
Filed Jan. 12, 1935 2 Sheets-Sheet 2
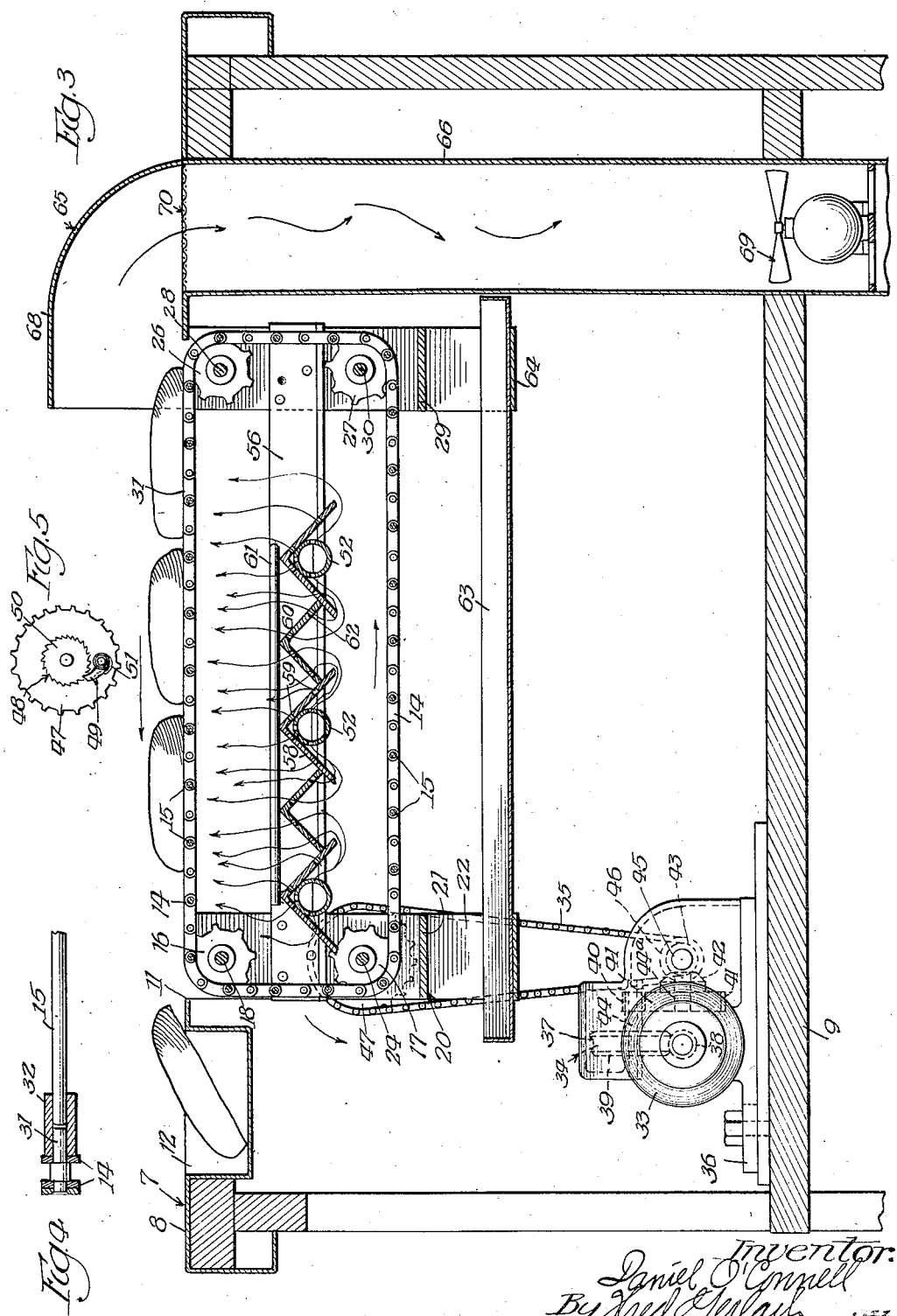

Patented Apr. 6, 1937

2,076,479

UNITED STATES PATENT OFFICE 2,076,479

AUTOMATIC TOASTER

Daniel J. O'Connell, Chicago, Ill., assignor to O'Connell's, Inc., Chicago, Ill., a corporation of Illinois Application January 12, 1935, Serial No. 1,461

2 Claims. (Cl. 126—41)

The present invention relates generally to toasters for use in restaurants and like eating establishments in connection with the toasting of bakery products such as buns. More particularly the invention relates to that type of toaster which is automatic in operation and includes a heater together with means for moving the buns away from the heater after toasting thereof.

One object of the invention is to provide a toaster of this type which is an improvement upon, and is simpler in construction than, previously designed toasters of the same general character.

Another object of the invention is to provide a toaster of the type under consideration in which the means for supporting and discharging the buns with respect to the heater consists of an endless, motor driven conveyor which extends around the heater and consists of a pair of laterally spaced chains and a plurality or series of rods between the two chains.

Another object of the invention is to provide a toaster of the last mentioned character in which the rods are connected to the chains in such manner that they may be readily removed for cleaning purposes.

Another object of the invention is to provide a toaster of the type and character under consideration which is adapted for use with a table having a rectangular opening in the top thereof, and in which the upper reach of the conveyor is disposed in the opening so that it is substantially flush with the table top and the operating parts of the toaster together with the heater are positioned beneath the table top.

A further object of the invention is to provide an automatic toaster of the type and character last mentioned in which the buns after toasting thereof are discharged from the upper reach of the endless conveyor into a trough and the fumes resulting from toasting and combustion are drawn away by means of a suction device with a hood inlet at the receiving end of the conveyor.

A still further object of the invention is to provide a toaster of the aforementioned type in which the heater is mounted and constructed in a novel manner and supports removably a combined flame deflector and heat distributor.

Additionally one of the objects of the invention is to provide an automatic toaster which is extremely efficient in operation and may be produced at a low cost by reason of the fact that it embodies a simple and novel arrangement of parts.

Other objects of the invention and the various advantages and characteristics of the present toaster construction or design will be apparent from consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 3 is a vertical longitudinal section showing the arrangement and design of the endless conveyor and the driving mechanism therefor;

Figure 4 is a detail section exhibiting the manner in which the rods of the endless conveyor are removably connected to the chains; and Figure 5 is a detail view of the ratchet connection which forms a part of the drive between the motor and the endless conveyor.

Figure 1:
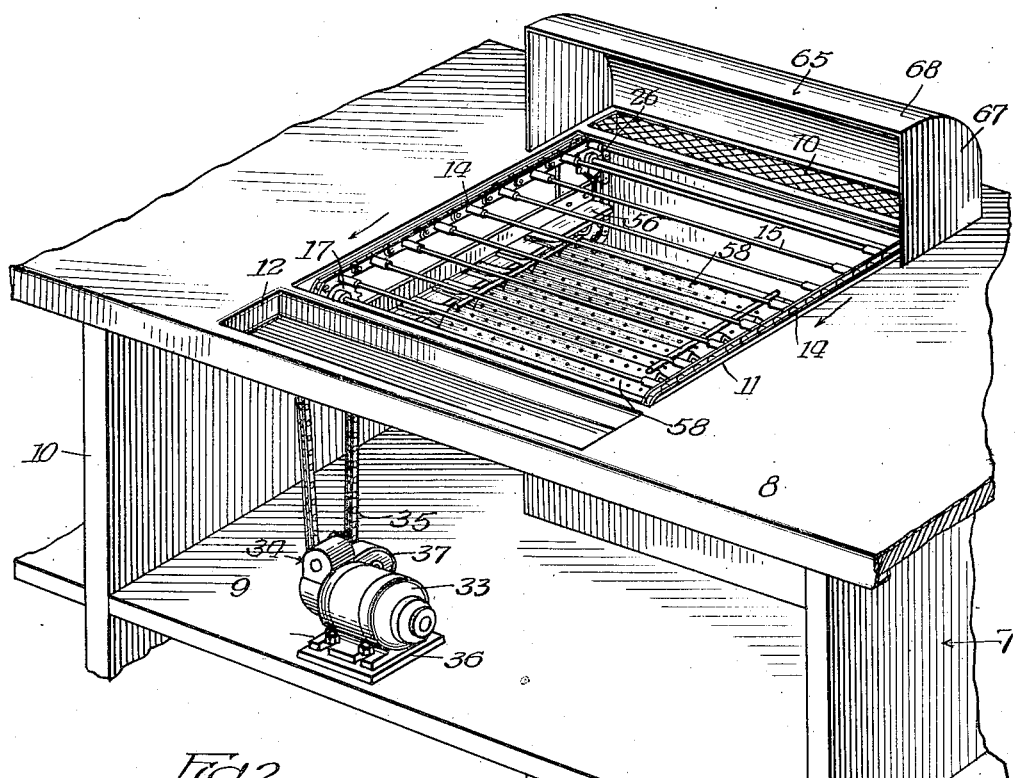
Figure 1 is a perspective of a table having applied thereto a toaster embodying the invention.

The toaster which forms the subject matter of the invention is designed primarily for use in a restaurant or like eating or food distributing establishment. It is associated with a table 7 and operates as hereinafter described to toast buns and then to discharge them automatically after toasting thereof. The table 7 as shown in Figure 1 has a flat horizontally disposed top 8 and includes a platform 9 beneath the top. The top 8 is supported by legs or uprights 10 in spaced relation with respect to the floor of the restaurant in which it is used, and embodies a rectangular opening 11. This opening extends transversely of the table and is disposed directly over the platform 9. The latter extends between and is supported by the legs or uprights 10. The top 8 of the table embodies in addition to the rectangular opening 11 a trough 12. This trough is the same in width as the opening 11 and is disposed directly in front of the latter. It is formed of sheet metal or other suitable material and serves as a receptacle for receiving the buns after toasting thereof.

Figure 2:
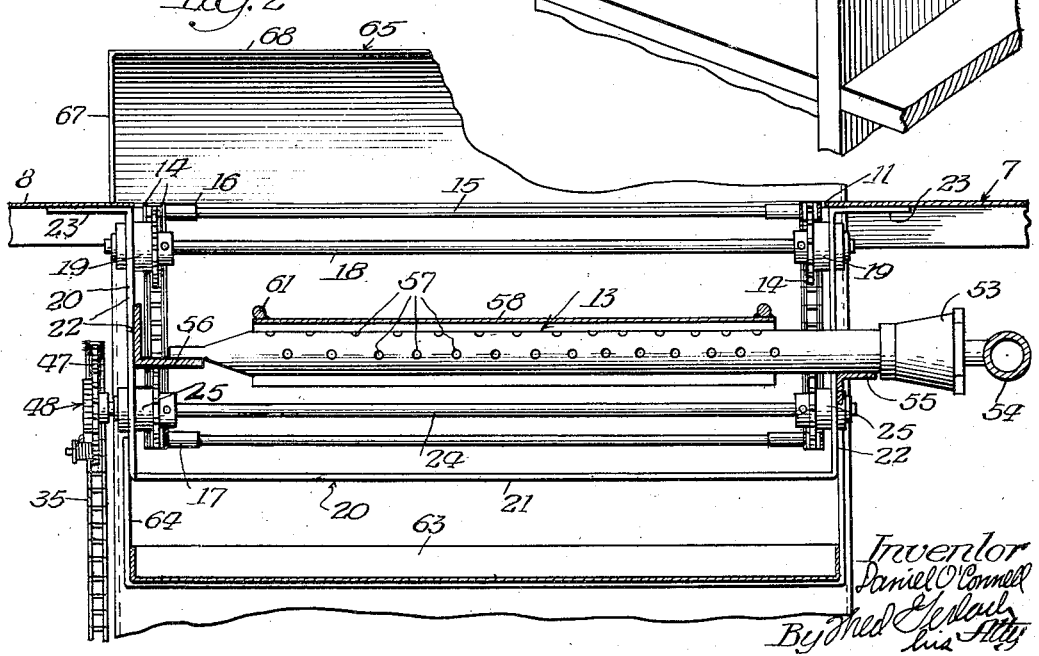
Figure 2 is a vertical transverse section of the toaster illustrating in detail the arrangement of the various parts and the construction and character of the heater.

The toaster comprises an endless conveyor which is disposed in the rectangular opening 11 and serves during drive thereof as hereinafter described, to convey the buns over a gas heater or burner 13 and to discharge them into the trough 12. This conveyor extends horizontally and comprises a pair of laterally spaced endless chains 14, and a plurality of rods 15. The rods are connected to and extend between the chains and support the buns as shown in Figure 3. The chains 14 are located immediately adjacent to the portions of the table top 8 that define the sides of the opening 11, and extend from the back of the opening to the front. They are supported at their front ends by a pair of sprocket wheels 16 and a pair of sprocket wheels 17, and are arranged so that the top or upper reaches thereof are substantially flush with the top face of the table top 8. The sprocket wheels 16 are disposed in the front portion of the rectangular opening 11 and are mounted in laterally spaced relation on a cross shaft 18. This shaft extends lengthwise of the table and is journalled at the ends thereof in a pair of bearings 19 on a stirrup 20. The latter, as shown in Figure 2, is formed of band-iron and is U-shaped in design. It underlies the top of the table 8 and consists of a cross-piece 21 and a pair of upwardly extending legs 22. The legs are spaced apart by the cross-piece 21 a distance equal to the width of the rectangular opening 11 and have out-turned flanges 23 at their upper ends. These flanges underlie and are bolted or otherwise secured to the underface of the top 8 so that the stirrup depends from the table top. The bearings 19 are suitably secured to the upper ends of the legs 20 of the stirrup. The sprocket wheels 16 abut against the bearings and are fixedly secured in any suitable manner to the shaft 18. The front ends of the chains 14 of the conveyor pass around the sprocket wheels 16 and then extend downwardly and pass around the sprocket wheels 17. The latter are disposed directly beneath the sprocket wheel 16 and are mounted on a shaft 24. This shaft is journalled at its ends in a pair of bearings 25 which are carried by the lower portions of the legs 22 of the stirrup 20. The rear ends of the chains 14 of the endless conveyor are supported by and extend around a pair of sprocket wheels 26 and a pair of sprocket wheels 27. The sprocket wheels 26 are fixed to and are mounted on the ends of a shaft 28 which extends lengthwise of the table and is journalled at its ends in a pair of bearings (not shown). These bearings are supported on the upper ends of the legs of a U-shaped stirrup 29 which is similar in construction to the stirrup 20 and is connected to and depends from the under or bottom face of the top 8 of the table. The sprocket wheels 27 are disposed directly beneath the sprocket wheels 26 and are mounted on a shaft 30. The latter underlies and extends parallel to the shaft 28 and is journalled at its ends in a pair of bearings which are connected to the lower portions of the legs of the stirrup 29. The chains 14 pass upwardly from the sprocket wheels 27 and then extend around the sprocket wheels 26.

The rods 15 which extend between the two chains 14 and form with the latter the endless conveyor for the buns are removably connected to inwardly extending studs 31 on certain of the pivot pins of the chains by means of sleeves 32. These sleeves as shown in Figure 4 are soldered to and project beyond the ends of the rods. The outer ends of the sleeves are designed to receive the studs and abut against the inner faces of the adjacent links of the chains. The rods 15 are formed of spring wire. Because of this, they may be removed from the chains for cleaning or replacement purposes simply by arching or bending them centrally and sliding the sleeves 32 out of engagement or contact with the studs 31.

The conveyor is driven for bun moving purposes by means of an electric motor 33, speed reducing gearing 34 and an endless chain 35. The motor 33, as shown in Figures 1 and 3, is mounted on a block 36 on the platform 9 and is supplied with current by a pair of conductors (not shown). The speed reducing gearing 34 is associated with the motor and comprises a housing 37. The latter is fixed to one end of the casing of the motor. In addition to the housing 37, the gearing comprises a worm 38, a worm wheel 39, a pinion 40, a gear 41, and a pair of beveled gears 42 and 43. The worm 38 is fixed to one end of the armature shaft of the electric motor 33 and meshes with and drives the worm wheel 39. The latter, as shown in Figure 3, is disposed above the worm 38 and is mounted on and fixed to a shaft 44 which extends transversely of the motor, and is journalled in bearings in the housing 37. The pinion 40 is fixedly secured to one end of the shaft 43 and meshes with and drives the gear 41. The latter is mounted on a shaft 44ª which is journalled in bearings in the housing 37 and supports the beveled gear 42. The beveled gear 43 meshes with and is driven by the beveled gear 42 and is mounted on a shaft 45 which extends parallel to the armature shaft of the electric motor and is journalled in bearings in the housing 37. The endless chain 35 extends substantially vertically between the electric motor 33 and the conveyor for the buns. The lower end of the chain extends around a sprocket wheel 46 on one end of the shaft 45. This sprocket wheel is fixedly secured to the aforementioned shaft and serves to drive the chain 35 from the speed reducing gearing 34 when the motor 33 is in operation. The upper end of the chain 35 extends around a sprocket wheel 47 on one end of the shaft 24. This sprocket wheel is coupled to the shaft 24 by a ratchet connection 48 and operates together with the shaft 24 and the sprocket wheel 17 to drive the endless bun carrying conveyor in the direction of the arrow in Figure 3. The ratchet connection 48 is shown in Figure 5 and consists of a dog 49 on the sprocket wheel 47 and a ratchet wheel 50 on the shaft 24. The dog is pivotally carried by the sprocket wheel 47 and is urged by a spring 51 into engagement with the teeth of the ratchet wheel 50. This ratchet wheel is fixed to the shaft 24 and is disposed outwardly of the sprocket wheel 47, as shown in Figure 2 of the drawings. When the electric motor 33 is not in operation it is impossible without the ratchet connection 48 manually to move the chains 14 because of the construction of the speed reducing gearing 34. By employing the ratchet connection 48 between the sprocket wheel 47 and the shaft 24, it is possible to move the chains 14 in their normal direction of travel and thus to bring successively into range for removal purposes all of the rods 15 while the motor 33 is stopped. The ratchet connection 48 constitutes simple means whereby the chains may be manipulated for rod removing purposes while the motor is stopped. It also constitutes means whereby the chains together with the rods extending therebetween may be manually moved or advanced towards the trough 12 in order to speed up travel of the buns during operation of the toaster in instances where the buns on the rods either due to dryness or other conditions toast more rapidly or quickly than is ordinarily the case.

The gas burner 13 is disposed between the upper and lower reaches of the chains 14 and consists of a plurality of horizontally disposed laterally spaced pipes 52. These pipes extend lengthwise of the table 7 and receive gas and air from a plurality of mixing heads 53. The latter are of standard or conventional construction and are connected to receive gas from a transversely extending horizontally disposed gas supply pipe 54. They are positioned adjacent to the end of the shaft 24 that is opposite to the sprocket wheel 47, and are connected respectively by screw thread connections to the contiguous ends of the pipes 52. Such ends of the pipes rest on an angle bar 55 which extends between and is supported by the legs of the stirrups 20 and 29 at one side of the toaster. The other or opposite ends of the pipes 52 are closed and rest on one leg of a horizontally disposed angle iron bar 56. The latter, as shown in the drawings, is secured to the legs of the stirrups at the other side of the toaster. The central portions of the pipes have holes 57 for the discharge of the mixture of gas and air that is supplied to the pipes by the heads 53. When the burner 13 is lighted the mixture of gas and air emanating from these holes burns and the heat that is produced thereby serves to toast the under sides of the buns on the top or upper reach of the endless conveyor. In order to distribute the heat under the upper reach of the endless conveyor and to deflect the flames so that they do not contact with the buns on the conveyor, angle iron bars 58 are provided. These bars are mounted on the pipes 52 of the burner 13 so that the legs thereof extend downwardly as shown in Figure 3. Holes 59 are formed in the bars 58 so as to permit the heated air resulting from combustion to pass upwardly to the buns on the conveyor. The bars 58 are secured together by means of angle iron bars 60. These bars are arranged in an inverted position similarly to the bars 58 and extend between and are welded or otherwise secured to the bars 58 as shown in Figure 5. Rods 61 are welded to the apex portions of the bars 58 and 60 and serve additionally to join or secure together the bars. By connecting the bars together in this manner a unitary deflector structure is provided which is readily removable from the pipes for cleaning purposes after the rods 15 are removed from the chains 14. The bars 60 have holes or apertures 62 to permit heated air to flow upwardly into contact with the buns on the upper reach of the endless conveyor. The gas supply pipe 54 is provided with a valve (not shown) so that the supply of gas to the pipes 52 may be controlled and the heat may thus be regulated.

In order to catch and retain crumbs from the buns on the conveyor, a pan 63 is provided. This pan underlies the bottom or lower reach of the endless conveyor and is removably supported on a pair of hangers 64. The latter are associated respectively with and depend from the stirrups 20 and 29. The pan is removable from the hangers by sliding it horizontally towards the front of the table 7.

A hood 65 and a conduit 66 serve to draw off from above the upper reach of the conveyor the fumes resulting from toasting and combustion. The hood 65 extends lengthwise of the table 7 and is positioned at the rear end of the endless conveyor. It extends over the rear end of the rectangular opening 11 and consists of a pair of sides 67 and an arcuate, combined top and back 68. This combined top and back is soldered or otherwise secured to the sides 67 and together with the latter forms a forwardly facing inlet for the hood. The conduit 66 communicates with the back portion of the hood and extends downwardly through the table 7 as shown in Figure 3. A motor driven fan 69 is associated with the conduit and serves when in operation to draw the fumes above the top reach of the conveyor into the hood 65 and out to the conduit 66. The discharge end of the conduit preferably leads away from the restaurant or like eating establishment in which the toaster equipped table 7 is employed. The upper end of the conduit 66 is provided with a screen 70 so as to prevent buns or other articles from passing into the conduit. In addition to preventing articles from passing or falling into the conduit 66, the screen 70 serves as a rest upon which toasted buns may be placed to keep them warm pending use or consumption. When the toasted buns are placed on the screen 70 the heated air which is drawn into the conduit 66 by the motor driven fan 69 passes around the buns and keeps them warm.

When the toaster is in operation and it is desired to toast buns with it, the buns are first cut in half and are placed on the rear end of the upper reach of the endless conveyor with the cut faces down. As soon as the buns are placed on the conveyor they are moved forwardly at a comparatively slow rate due to drive of the conveyor by the motor 33, speed reducing gearing 34, and the chain 35. As the buns travel over the pipes 52 of the gas burner 13, the under or cut faces thereof are toasted. When the buns reach the front end of the conveyor they are discharged into the trough 12 as shown in Figure 4. The speed of the conveyor is preferably such that the buns are toasted to the proper extent after travelling once over the burner 13. During the toasting operation the fumes resulting from toasting and combustion are drawn off from above the upper reach of the conveyor by the suction that is produced in the conduit 66 by the motor driven fan 69. When it is desired to clean the toaster the motor 33 is stopped and the burner 13 is closed or shut off. Thereafter the chains 14 are manually moved in their normal direction and the rods 15 are removed one at a time from the studs 31. After removal of the rods from the studs the deflector structure consisting of the iron bars 58 and 60 may if desired be lifted away from the pipes 52 of the burner and brushed or otherwise cleaned.

The herein described toaster is efficient in operation and may be produced at a low and reasonable cost due to the simplicity of its construction.

Whereas the toaster has been described in connection with the toasting of buns, it is to be understood that it may be used equally as well in toasting bread. When bread is toasted with the toaster one side of the slices or pieces is first toasted and then the bread is turned over and the other side toasted.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with a table having a rectangular opening in the top thereof and provided at one end of the opening with a trough and at the other end of the opening with a horizontal screen on which toasted buns may be placed, of a toaster comprising a horizontally disposed heater under the opening in the table top, an endless conveyor extending around the heater and having a substantially horizontal bun supporting reach disposed over the heater and positioned in the opening substantially flush with the table top, motor driven means for driving the conveyor so that the buns on said reach are moved slowly over the heater for toasting purposes in the direction of the trough and are automatically discharged into the trough, and means for eliminating the fumes resulting from toasting and at the same time drawing off the heated air which rises from the table top and circulating it around the toasted buns on the screen, comprising a hood-like element mounted on the table top and extending over the screen and said other end of the opening, a conduit beneath the table top leading downwards from the screen and communicating with the interior of the hood by way of said screen, and a motor driven suction fan in the conduit.

2. In combination with a table having a top with a rectangular opening therein, a toaster for buns and the like, comprising a supporting structure including a pair of elongated, laterally spaced, supporting elements disposed beneath and extending parallel to the edges of the top which form the sides of the opening, a gas heater positioned under the opening and consisting of a plurality of horizontally disposed gas pipes having the ends thereof supported in the aforesaid elements, an endless conveyor extending transversely around the pipes and having a substantially horizontal bun supporting reach positioned over the heater and so that it is in the opening and substantially flush with the table top, said conveyor comprising a pair of laterally spaced chains with pairs of oppositely facing studs on certain of the links thereof and rods extending between the chains and having the ends thereof secured removably to the studs, a heat distributor resting loosely on the pipes and adapted upon removal of the rods in the horizontal reach of the conveyor to be lifted away from the heater and out through the opening in the table top for cleaning purposes, and motor driven means for driving the conveyor so that the buns on said horizontal reach will move horizontally over the heater for toasting purposes.

DANIEL J. O'CONNELL.